E. R. LOWEREE AND G. F. JACKSON.
MACHINE FOR DOUBLE SEAMING CANS.
APPLICATION FILED OCT. 19, 1916.

1,320,700.

Patented Nov. 4, 1919.
6 SHEETS—SHEET 1.

Inventors:
Edgar R. Loweree,
George F. Jackson,
by Spear, Middleton, Donaldson & Spear
Attys.

E. R. LOWEREE AND G. F. JACKSON.
MACHINE FOR DOUBLE SEAMING CANS.
APPLICATION FILED OCT. 19, 1916.

1,320,700.

Patented Nov. 4, 1919.
6 SHEETS—SHEET 2.

Inventors:
Edgar R. Loweree,
George F. Jackson,
by Spear, Middleton, Donaldson & Spear
Atty's.

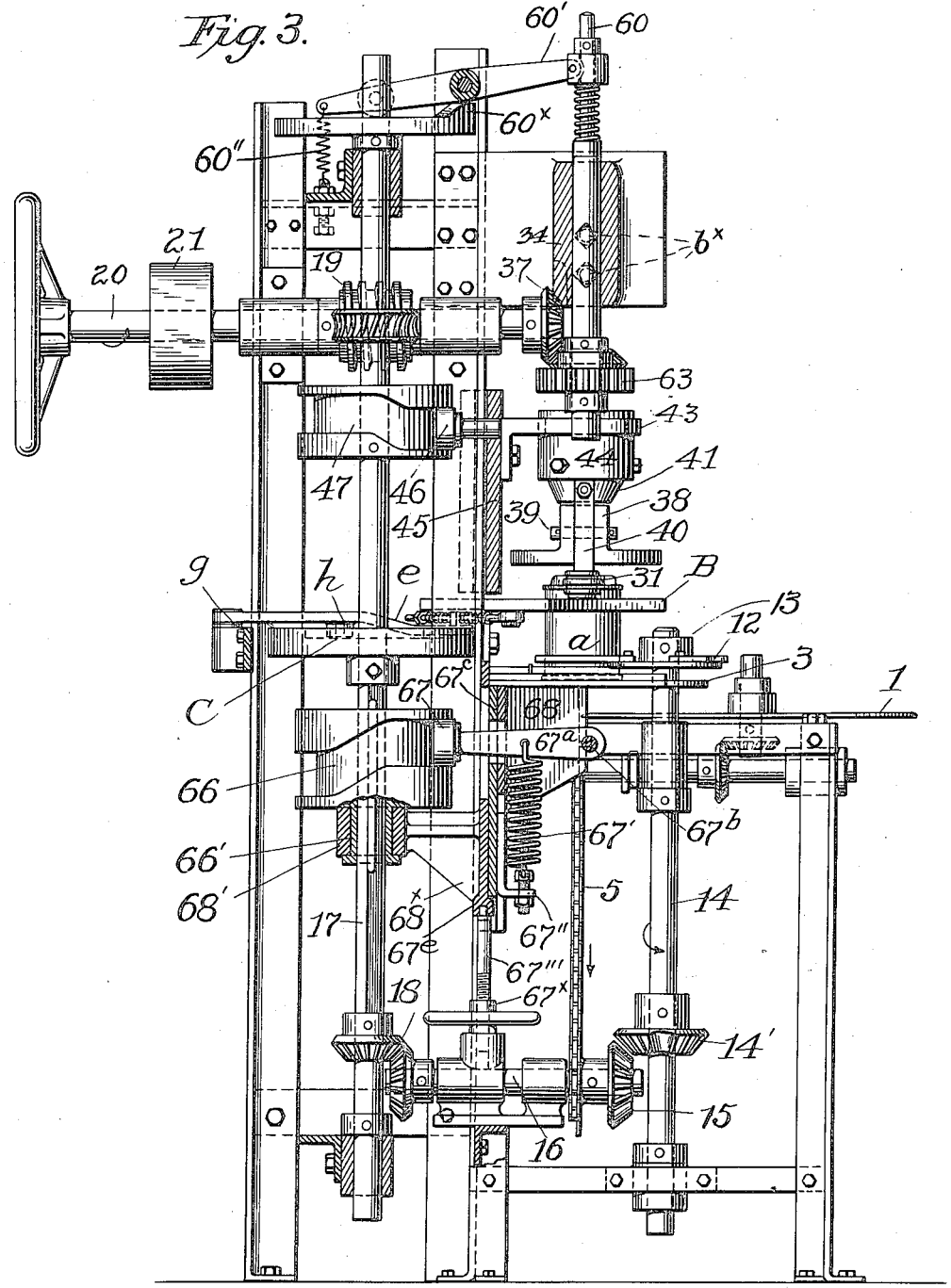

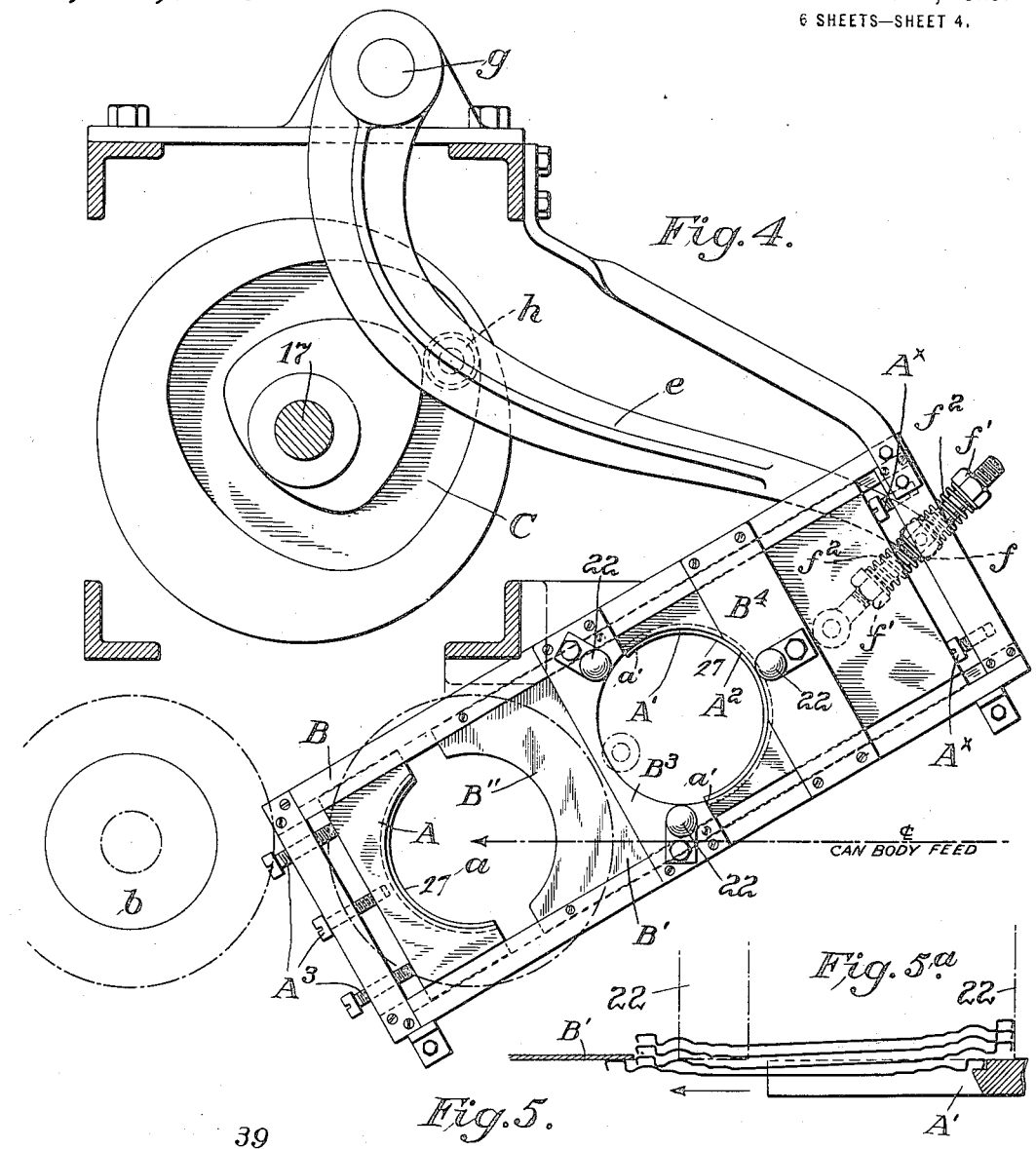

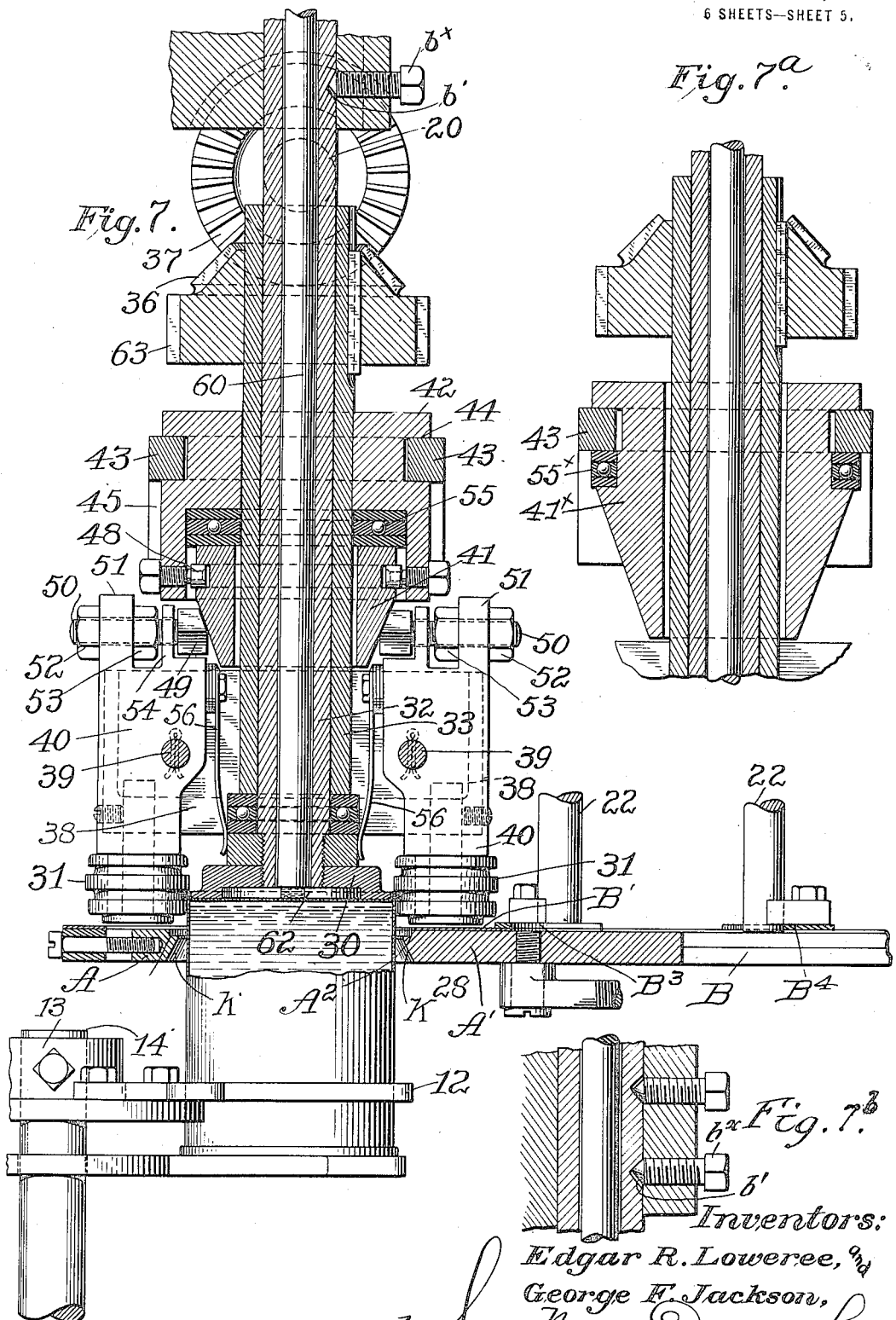

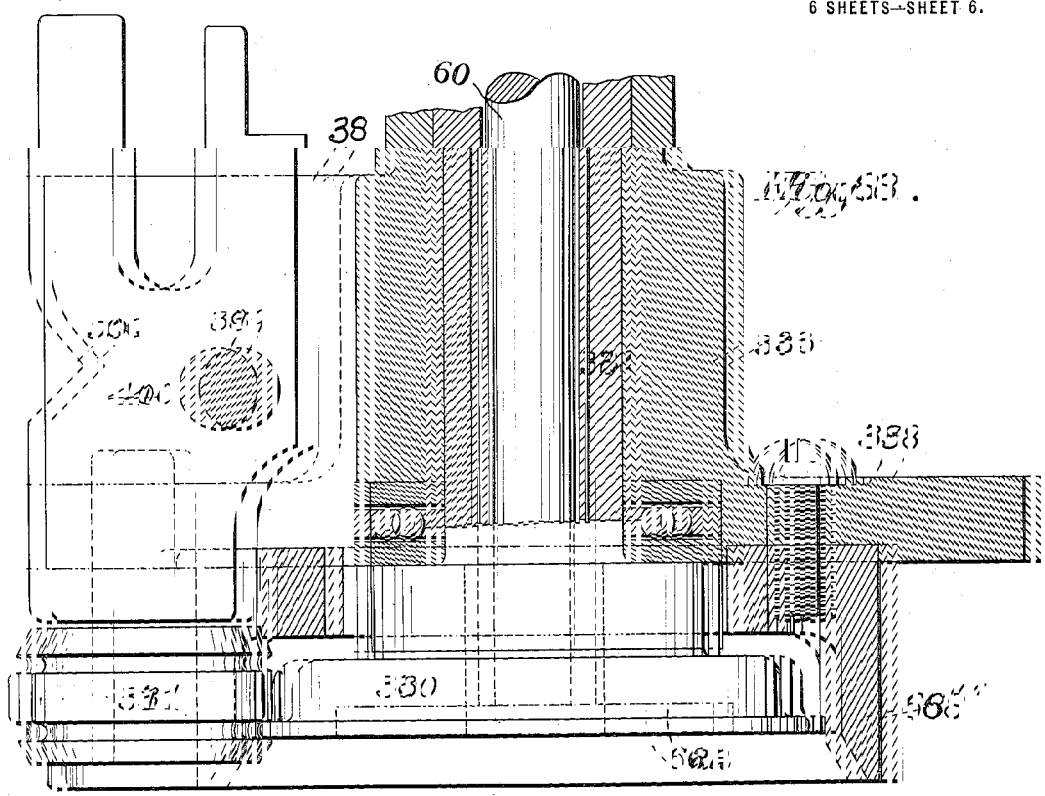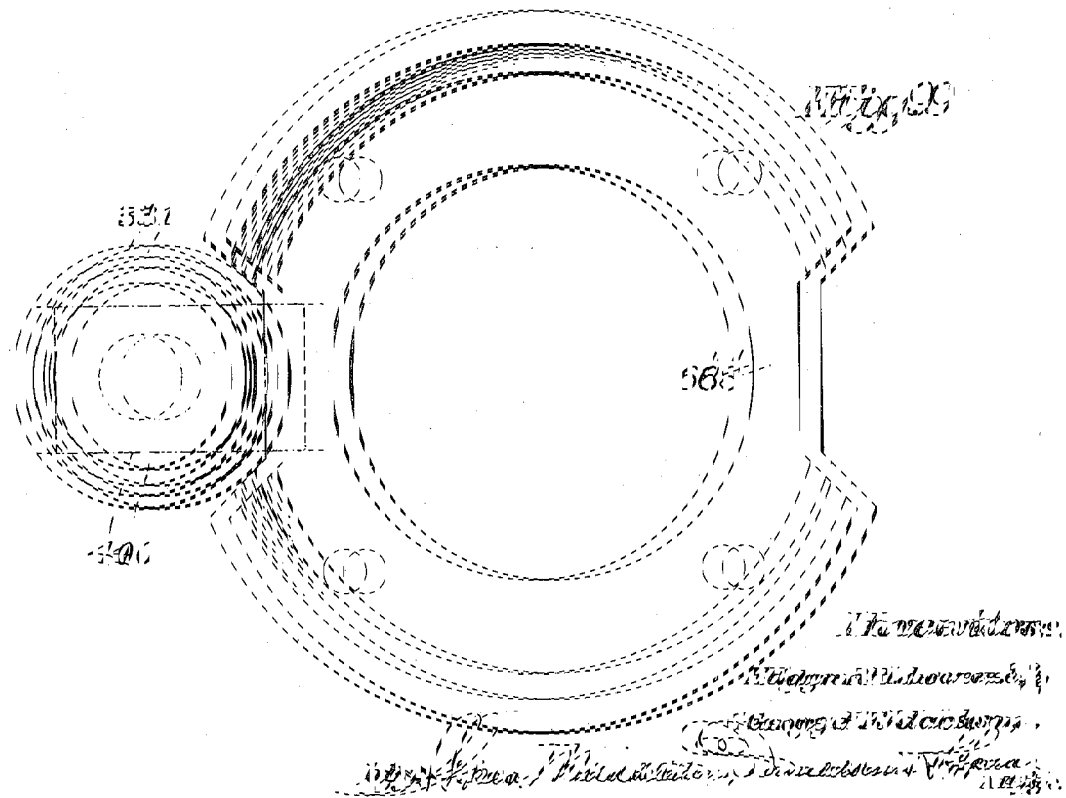

UNITED STATES PATENT OFFICE.

EDGAR R. LOWEREE AND GEORGE F. JACKSON, OF BALTIMORE, MARYLAND, ASSIGNORS TO SOUTHERN CAN COMPANY, OF BALTIMORE, MARYLAND, A CORPORATION OF MARYLAND.

MACHINE FOR DOUBLE-SEAMING CANS.

1,320,700.  Specification of Letters Patent.  Patented Nov. 4, 1919.

Application filed October 19, 1916. Serial No. 126,572.

*To all whom it may concern:*

Be it known that we, EDGAR R. LOWEREE and GEORGE F. JACKSON, citizens of the United States, and residents of Baltimore, Maryland, have invented certain new and useful Improvements in Machines for Double-Seaming Cans, of which the following is a specification.

The invention is for uniting heads to can bodies by a double seaming operation.

One feature of the invention includes a reciprocating slide feed for the can heads, which will provide a simple construction and one capable of feeding the can heads in such manner as to insure rapid production of the complete article. This feed slide constitutes part of a holder for the can head coöperating in this holding action with a complementary stationary holding part or section for holding the newly fed can head in proper alinement with the can which is to take the head and with the seaming mechanism which is to unite the head with the body.

Other features of the invention will be clear from the following description and will be particularly pointed out in the claims.

In the drawings:

Fig. 3 is a side elevation partly in section, the view being taken looking from the right of Fig. 2.

Fig. 4 is a plan view of the can head feeding mechanism detached.

Fig. 5 is a sectional view of the said feeding mechanism.

Fig. 5ª is a diagram indicating that the lowermost can cover has been fed forwardly slightly and the other covers have dropped down with the one next to the bottom interlocked therewith.

Figure 6:
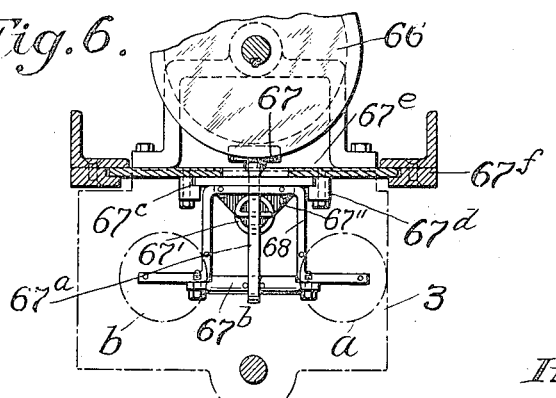
Figure 2:
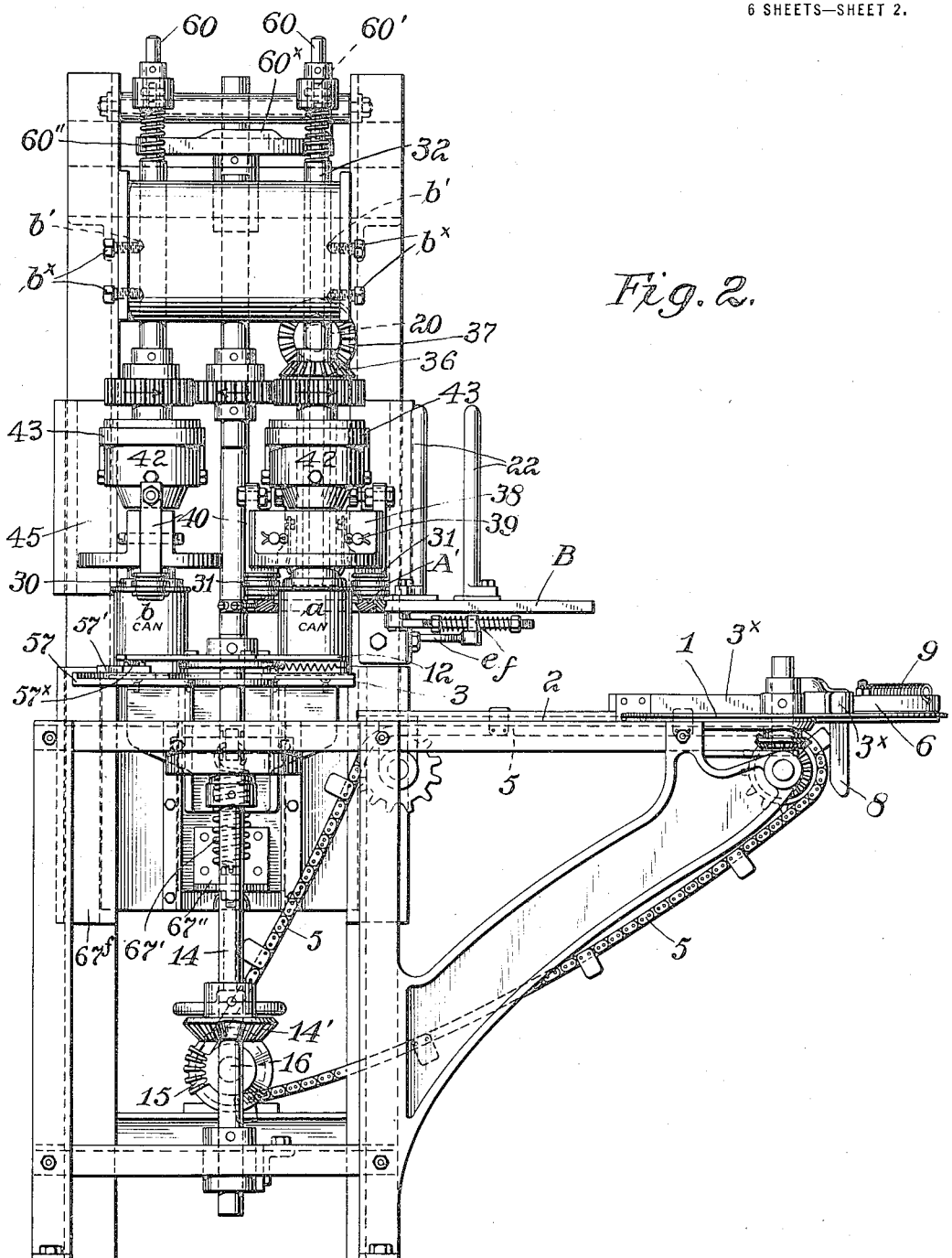
Fig. 2 is a front view.

Fig. 6 is a plan view with parts in section relating to the means for supporting and moving the can body supporting table.

Fig. 7 is a vertical sectional view of the seaming head at the first station. Fig. 7ª is a modification.

Fig. 7ᵇ is a detail sectional view of means for adjusting the chuck spindle vertically.

Fig. 8 is a sectional view with parts in elevation.

Fig. 9 is a bottom plan view of the guide ring of Fig. ?

The can bodies are fed to the machine from a rotating plate 1 onto which the bodies may be delivered in any suitable way. From this rotary table the can bodies are delivered onto tracks 2 between guides 3ˣ and 4, and they are moved along between these guides by dogs on an endless chain 5, which is suitably operated. The track or table structure 2 extends in close proximity to a vertically moving table 3, so that the can bodies are delivered from the tracks or table 2 onto the upper surface of this vertically reciprocating table when the same is in its lowermost position, it being shown, however, up.

The movement of the can bodies from the table 1 into engagement with the feed chain 5 is controlled by a pivotally mounted dog 6 pivoted to the frame at 7 and having a depending cam shaped arm 8 to be engaged by the projections on the feed chain. The controller 6 is under tension of a spring 9, which presses its forward end against the can bodies and normally restraining the said can bodies from progressing forwardly by pressing them against the guide rail 3ˣ.

When a projection on the feed chain, however, comes around to take a can body and feed it forward, the first action of this projection will be against the cam-shaped depending arm 8 to press it laterally and this will cause the swinging of the controller 6 outwardly at its front end to thereby release the can body and allow it to be moved forward by the constantly rotating disk or table 1, and in this way the can body will get into position to be taken by the projection on the chain and be fed forwardly.

Figure 1:
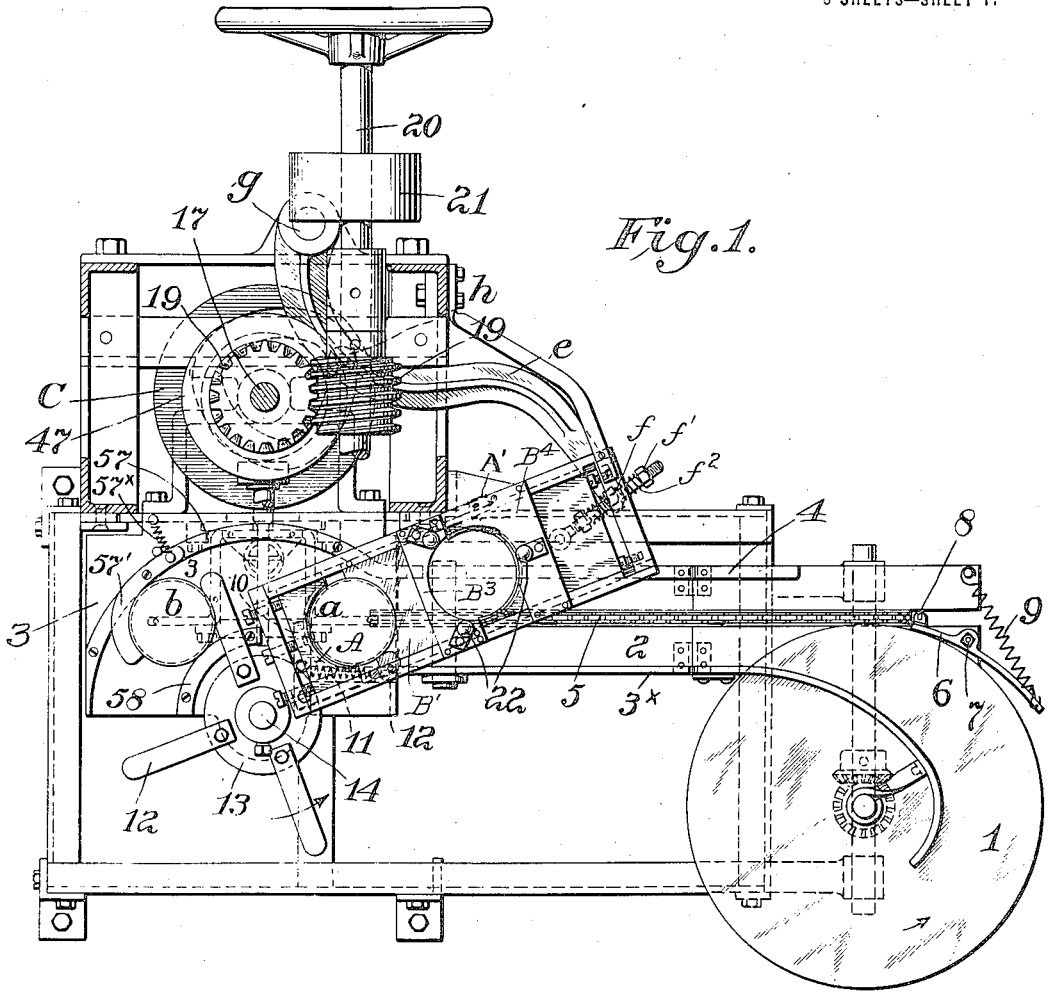
Figure 1 is a plan view of a machine embodying the invention.

A can body is shown diagrammatically at the station *a*, in Fig. 1, this being the position it assumes when delivered by the feed chain onto the table 3 and the table has been raised. This position of the can body is determined by the combined action of the feed chain and a stop 10 which is pivotally mounted and is pressed by a spring 11. After receiving its head or cover and having the same seamed into connection therewith the can lowers with the table and is removed from the station *a*, Fig. 1, to station *b*, Fig. 1, and for so moving the can, pusher arms 12 are provided, radiating from and attached to a hub or disk 13 mounted on the shaft 14, which has suitable bearings in the frame. This shaft is driven intermittently by a bevel gear 14′ thereon and a mutilated bevel gear 15, on a horizontal shaft 16 suitably mounted in the frame and driven from a vertical shaft 17 through bevel gearing 18, Fig. 3, this vertical shaft 17 in turn being driven through worm gearing at 19 from a horizontal shaft 20 having suitable bearings in the frame, the said shaft 20 being driven through a belt wheel 21.

The feeding mechanism for the can heads comprises a partial seat portion A held in a plate or frame B suitably supported from the frame of the machine and extending at an angle to the general plane of movement of the can bodies as transported by the chain 5 onto the table 3. The frame B has an elongated opening therein, in which slides the other portion of the can head or cover seat indicated at A'. Both of these seat portions for the can head are shouldered at 27 to receive the can head and the seat portion A' is of an extent slightly more than a semi-circle while the complementary seat portion A is correspondingly less in extent than a semi-circle. The seat portion A' which constitutes also the feed slide for the cans or covers is suitably guided in ways or tracks in the frame B and it reciprocates under a suitable holder or hopper for the can covers. This hopper is formed of vertical rods 22 supported by brackets at their lower ends in any suitable manner from stationary frame parts. The feed slide is operated by the lever $e$ having a yielding compensating connection at $f$ with the slide, the said lever being pivoted at $g$ to the frame and being operated by a grooved cam C mounted on the shaft 17. This cam rotates in a horizontal plane and acts against the roller $h$ of the lever. When the feed slide is in its retracted position the lowermost can cover or head will fall into the seat thereof at its more than semi-circular end and when the feed slide moves forwardly it will push this can cover or head from beneath the pile and because the seat is of an extent more than a semi-circle it will act as a support for this can head and said head will be conveyed to the stationary seat portion A and these two seat portions being complementary of each other the head will be held in the semi-circular seat now formed by the stationary and sliding sections and the head will now be at the station $a$ directly over the can body, which as the table moves up will now rise through the opening provided within the semi-circular seat and, taking on this head or cover, the can will pass upwardly to the seaming chuck 30 and the first seaming operation will be performed by the mechanism at the first seaming head. While this action is being performed the feed slide A' can retract to allow the next can head to drop into the seat on this slide and the parts will then be ready for another action. When the table 3 descends the can with its partially seamed head will lower past the stationary seat section A, the reduction in the diameter of the head permitting this action. The stationary seat portion A as well as the sliding section A' has its lower wall flared or beveled as at K to act as a centering means and also as a truing up means for the can body as it is raised.

In order to insure that only the lowermost cover of the stack in hopper 22 be carried forward with the feed slide A' a guard plate B' is used, Figs. 4 and 5, this having its end edge adjacent to and facing the slide A' formed on a curve at $B^2$ complementary to the curved end of the slide A'. This plate is located just above the plane of the seat or shoulder $A^2$ of the feed slide upon which the flange of the lowermost can cover or head is received to be fed forward. It happens that when the feed slide has made a slight forward movement and carried the lowermost can cover a slight distance forward the cover next above it will drop down at its forward end into the recess in the lowermost cover, see Fig. $5^a$, and would be carried forward with it, but the guard plate will prevent this action as the next to the lowermost cover even should it be pressed forward will be held by the edge of the guard plate against which it will bear at some point along its edge, it being understood that the second cover will then be in inclined position with its front edge lowermost.

Furthermore, the guard plate being arranged in position to allow only enough space for the lowermost cover to pass beneath it will serve to maintain the cover being fed in proper horizontal position and prevent it from tipping and becoming disengaged from the shoulder in the cover feed slide A'.

The fixed guard plate B' has a curved end B'' to conform to the size of the cover to allow it to pass vertically, this construction, however, giving a maximum guarding control of the cover as it is moved to the section A. This section A may be adjusted by the screws $A^3$ and there are stop screws at $A^x$ for the feed slide. The guard plate in connection with the feed slide having a seat or shoulder for the can cover of more than a half circle performs an additional function as follows: Should a cover be fed to the station $a$ and nobody be present at said station no harm will result, because the feed slide, under this condition, will simply draw the cover back to its former position under the stack of covers, because the guard plate will hold the cover in the seat or shoulder against tipping and the shoulder being more than a half circle the cover will remain gripped by the portions $a'$ of the feed slide which extend beyond the diameter of the seat. In this action as soon as the feed slide begins to retract the cover will be drawn beneath the edge B″ of the guard plate. It will be understood that although the covers above the lowermost one fall into inclined position as indicated in Fig. 5ª when the lowermost cover is moved part way from normal position no harm can result from this because the outward movement of the lowermost cover and feed slide will level up the inclined covers to horizontal position and they will rest on the top of the slide in this horizontal position until the slide is fully retracted.

The hopper rods or standards 22 are supported from cross plates B³, B⁴ extending across the frame B. The compensating connection at $f$ includes a link pivoted to the feed slide and having adjustable nuts $f'$ between which and the block $f$, loose on said link, springs $f^2$ are arranged. The lever $e$ is pivoted to this block. The cam C gives the lever an excess movement in both directions but the springs $f^2$ take up this excess movement and insure that the feed slide will be moved to its full limit in both directions.

From the above construction it will be noticed that the operations can be carried on with expedition, as it will not be necessary to keep the slide A′ in its advanced position longer than is required to have the can body rise high enough to take on its cover or head, the said slide having ample time to get back to its retracted position and take on a new head and be ready to advance while the seaming operation at the first head is being performed.

While the seaming operation above described is being performed at the station $a$, the second seaming operation is being performed on the can previously operated on and this second seaming operation takes place at the station $b$. This can has been moved to the station $b$ from the station $a$ by the pusher arms 12 and it has been guided into position by the guide walls 57 and 58.

A can at the station $b$ will rest upon the upper surface of the table 3 and when this table rises, as above described, to raise the can at station $a$ to take on its cover and carry it up to the first seaming mechanism the can at station $b$ will also be elevated.

The particular construction of the seaming heads need not be gone into in detail at this point, as this structure is referred to later on in this specification.

It may be pointed out here however, that the seaming heads besides the chuck comprise each a pair of seaming rolls 31 on arms 40 pivotally mounted on a rotating head 38 at 39, the arms being spread apart at their upper ends to set the rolls up to their work by a cone member 41 movable vertically by connection to a cam 47 mounted on the vertical shaft 17. The arms 40 bear on this cone and the cone is permitted to have rotary movement under the pressure of the arms to reduce the wear.

The chuck 30 is held by a tube 32 fixed in the frame. The rotary head 38 is carried by a sleeve 33 which is rotated through suitable gearing.

The seaming mechanism at station $b$ is substantially the same as that at station $a$ with the exception that it has a conical guide ring 68″, Figs. 8 and 9, depending for guiding the can body with its partially seamed head to the stationary chuck 30 of this seaming mechanism. The ring is cut away at points necessary to allow the seaming rolls to engage the can head. It is fixed to rotary head 38.

Further the pivoted arms carrying the seaming rolls are made resilient by notching at $x$ to provide a yielding or compensating effect when the rolls pass over the side seam of the can.

After the second seaming operation has been completed, it being understood that this takes place at the station $b$ at the same time that a first seaming operation is taking place on the newly positioned can at station $a$, the table 3 descends and lowers both cans below the level of the can head feeding means and thereafter the can at station $b$ is discharged from the machine by the movement of the pusher arm 12 and at the same time another one of the pusher arms 12 moves the partly seamed can from station $a$ to station $b$. In both of these operations the cans are moved along the surface of the table 3 which forms a support therefor, this moving effect being accomplished by the arms 12, as above stated.

At the same time that this transporting of the can is taking place along the table 3 the feed slide A′ is operating to move a can head to the fixed seat portion A and there hold it until the newly fed can body is raised at the station $a$, by the rise of the table 3, to take on this cover and lift it to the seaming mechanism.

The guard rail 57 has a yielding portion 57′ under tension of a spring 57ˣ which will act as a stop for the can to make it register with the second seaming mechanism. This stop will yield to allow the can at station $b$ to be discharged under the action of the pusher arm 12.

The vertical movement of the can supporting table 3 is derived from a cam 66 on the shaft 17, the groove of which cam operates upon a roller 67 connected with a bracket 68, slidable vertically in suitable guides in the frame, the said bracket carrying the table.

The roller 67 is directly carried by an arm 67ª pivoted to a cross bar on the bracket at 67ᵇ. The base plate 67ᶜ of the bracket is slidable in guides 67ᵈ on the frame plate 67ᵉ, which plate is adjustable vertically in ways 67ᵗ of the main frame. The arm 67ᵃ is connected by a spring 67' with a lug 67" fixed on the slidable base plate 67ᶜ of the bracket. The slidable frame plate 67ᵉ is adjusted to different positions vertically by a screw threaded rod 67'" operated by a nut 67ˣ having a hand wheel for turning it. By adjusting the frame plate 67ᵉ vertically the bracket 68 with the can body supporting table is set at different heights to suit different lengths of cans and at the same time the operating cam 66 is set to correspond with the adjustment of the table, because the cam has an extension 66' turnable in the bearing 68', which is carried by a bracket 68ˣ extending from the vertically adjustable frame plate 67ᵉ.

The cam is designed to slightly overthrow in imparting vertical movement to the table and the spring 67' and the pivoted arm construction is provided to compensate for variations in the heights of cans, it being observed that the maximum vertical movement of the table is slightly in excess of that necessary for the shortest can and therefore when this can, with its cover, is raised into contact with the chuck 30 the slight excess movement which the can is capable of imparting will be absorbed by the spring and pivoted arm arrangement and of course a similar compensating action will take place, though in greater degree, in the case of cans which are above the average height, the spring and pivoted arm absorbing the excess movement imparted from the cam.

It will thus be seen that we provide an adjustment by means of the hand wheel nut 67ˣ, rod 67'" and frame plate 67ᵉ which will approximate the upward limit of the can table's movement and also we provide a compensating means which will take care of cans of varying heights.

In the seaming head at the first station a center pad 62 is arranged, carried by rod 60 which is operated by a lever 60" in turn operated by a spring 60" and a cam 60ˣ. This pad is operated to force the can with its partly seamed cover away from the chuck 30. It performs a further function as follows: The action of the cam 60ˣ will depress the pad onto the can cover, which is in the pocket or seat formed by the feed slide A' and the fixed seat portion A and thus the can cover will be held down with some pressure when the can body is lifted to take on this cover and as the upward movement of the can body continues the pad will move up with the cover and said cover will be properly positioned in relation to the chuck, the cover being held on the can by the pad during this action. When the pad is all the way up it is seated in a recess of the chuck. A similar pad is employed at the second seaming head, the function of which however, is to discharge the can from the chuck, both pads being operated from the same lever and cam mechanism.

In order to adjust the chuck vertically within narrow limits we employ a pair of screws bˣ having conical ends to work against inclined surfaces b' of the chuck spindle, so that by adjusting these screws the chuck can be set either up or down.

The angular arrangement of the feed slide mechanism for the can head is for the purpose of leaving the track 2 with the feed chain 5 exposed from above to a maximum extent for the application of any device which is to coöperate with the cans as they come along, such for instance, as a plunger mechanism for leveling up the contents of the can.

Reverting to the construction of the seaming heads and associated parts the chuck 30 is attached to the lower end of a sleeve 32, which extends up through an outer sleeve 33. The sleeve 32 is held against rotation, its upper end passing through a bearing 34 through which the set screws bˣ extend to hold the sleeve rigid against movement in all directions which consequently is true also of the chuck 30. The outer sleeve 33 is rotated constantly through a bevel gear 36 keyed thereon, which is driven through a bevel gear 37 on the upper horizontal shaft 20. The sleeve 33 carries arms or brackets 38 to which are pivoted at 39 the arms 40 which carry the seaming rolls at their lower ends. The arms 40 are operated for setting the seaming rollers against the can head by the cone member 41 surrounding the sleeve 33 and operated vertically by a yoke or collar 42, also surrounding the sleeve, 33, which collar is moved vertically by a fork 43 engaging its groove 44, the said fork being carried by a sliding plate 45, which has a roller 46 connected therewith, which engages the groove in a cam 47 mounted on the vertical shaft 17. The collar 42 has projections or rollers 48 at its lower end which engage a groove in the cone member 41, so that the vertical movements of the collar derived from the cam 47 will also move the cone 41 vertically. The surface of the cone is borne upon by the projections 49, carried on screw threaded shanks 50, which pass through the lug 51 of the seaming arms 40, the said shank being clamped by inner and outer nuts 52, 53, and by these nuts the bearing projection 49 can be adjusted. The shank also passes through an ear or lug 54 on the seaming arm 40. Anti-friction bearings are interposed at 55 between the collar 42 and the cone 41 and also between the lower end of the rotary sleeve 33 and the chuck 30. Springs 56 will press the seaming rollers away from the chuck 30 when the cone 41 rises. This cone fits the sleeve 33 loosely so as to have a certain amount of lateral play and because of this the seaming levers 40 with their rolls 31 will accommodate themselves automatically to irregularities of the surface operated upon.

In Fig. 7ª is shown a modification of the cone, this being marked 41ˣ. The member 43 engages this conical member directly instead of through the intermediate member 42, as in the form first described, and ball bearings are interposed at 55ˣ between the cone member and the operating member 43. The cone besides being permitted lateral shifting movement can turn under the action of the frictional pressure from the seaming arms so that wear between the cone and the seaming arms will be materially reduced, and member 42 can also turn.

What we claim is:—

1. In combination in a can heading machine, a seaming mechanism, means for feeding cans into alinement with the said seaming mechanism, means for feeding can heads to and holding them in alinement with said seaming mechanism and the positioned can, said means comprising a member having a back and forth movement and provided with a part of the seat for the can head, and a stationary member having the complementary part of said seat and arranged in said horizontal plane with said feed member, the back and forth moving member advancing and retreating in relation to the complementary member and moving the can heads thereto, and holding them between itself and the complementary member until taken by the can body, and means for raising and lowering the can bodies, said bodies when raised taking on their heads from the seat in the two members, substantially as described.

2. In combination in a can heading machine, a seaming mechanism, means for feeding cans into alinement with the said seaming mechanism, means for feeding can heads to and holding them in alinement with said seaming mechanism and the positioned can, said means comprising a member having a back and forth movement and provided with a part of the seat for the can head, and a member having the complementary part of said seat and located in the same horizontal plane with the movable member, the back and forth moving member advancing and retreating in relation to the complementary member and moving the can heads thereto and holding them between itself and the complementary member until taken by the can body, and means for raising and lowering the can bodies, said bodies when raised taking on their heads from the seat in the two members, said members each having in addition to its can head seat a flared under part for guiding and truing up the can bodies, substantially as described.

3. In combination in a can heading machine, a seaming mechanism, means for feeding cans into alinement with the said seaming mechanism, means for feeding can heads to and holding them in alinement with said seaming mechanism and the positioned can, said means comprising a member having a back and forth movement and provided with a part of the seat for the can head, and a member having the complementary part of said seat, the back and forth moving member advancing and retreating in relation to the complementary member and moving the can heads thereto, and means for raising and lowering the can bodies, said bodies when raised taking on their heads from the seat in the two members, said back and forth moving member supporting and carrying the can head on its advance movement.

4. In combination in a can heading machine, a seaming mechanism, means for feeding cans into alinement with the said seaming mechanism, means for feeding can heads to and holding them in alinement with said seaming mechanism and the positioned can, said means comprising a member having a back and forth movement and provided with a part of the seat for the can head, and a member having the complementary part of said seat arranged in the same horizontal plane with the back and forth moving member, the back and forth moving member advancing and retreating in relation to the complementary member and moving the can heads thereto and holding them between itself and the complementary member until taken by the can body, and means for raising and lowering the can bodies, said bodies when raised taking on their heads from the seat in the two members, said back and forth moving member supporting and carrying the can head on its advance movement and with said complementary member supporting the can head over the can body, the can head seat portion in said movable member being of an extent greater than a semicircle, and the can head seat portion in the complementary member being of an extent less than a semicircle, substantially as described.

5. In combination, seaming mechanism for can heads and bodies, a can body feeder, and a can head feeder and holder comprising a frame having an elongated opening, a member sliding in said opening and having a part of the can seat, and a fixed portion at the end of said open frame having the complementary part of said can head seat, means for reciprocating the sliding member to move the can heads to the fixed portion and to hold them there, and means for raising the can bodies to take the can head from said parts, said sliding member supporting and carrying the can heads and remaining advanced to support them until taken by the rising can body, substantially as described.

6. In combination, a pair of seaming heads, one for performing the first seaming action and the other for performing the second seaming action, a can head seat below the first seaming head comprising separable sections with an opening between them for the passage of the cans, with means for opening and closing the same, one of said sections being fixed and the other being movable and acting as a carrier for the can head and as a holder for the same until the can body contacts therewith, means for lifting the cans to the first and second seaming heads and means for moving the cans into line with the first seaming head and from the first to the second seaming head, substantially as described.

7. In combination, a pair of seaming heads, one for performing the first seaming action and the other for performing the second seaming action, a can head seat below the first seaming head comprising separable sections with an opening between them for the passage of the cans, with means for opening and closing the same, one of said sections being fixed and the other being movable and acting as a carrier for the can head and as a holder for the same until the can body contacts therewith, means for lifting the cans to the first and second seaming heads and means for moving the cans into line with the first seaming head and from the first to the second seaming head, said lifting means comprising a vertically movable table common to both seaming heads, the said can moving means operating over the said table, substantially as described.

8. In combination, a pair of seaming heads, one for performing the first operation and the other the second operation on the can head and its body, a can head holder and feeding means comprising two sections, each having a portion of the can seat and a portion of a flaring wall for guiding and truing up the can body when raised to pass through the opening between said sections and take on the can head, one of said sections acting as a feeder for the can head, a hopper from which said section takes the can head and moves it to the other section, means for moving the can with the partially seamed head to the second seaming mechanism, means for raising and lowering the can at the first and second seaming mechanisms, a chuck and a seaming roll at each seaming mechanism, and a guide at the second seaming mechanism for guiding the can with its partly attached head to the second seaming mechanism, substantially as described.

9. In combination in a double seaming machine, two seaming heads arranged side by side, a table vertically movable and located below the seaming heads, a can body feeder moving in line with the centers of the stations below the said seaming heads, a rotary member operating over the table to push the cans from one station to the other along the said table and while the cans are supported thereon and a reciprocating can head feeder reciprocating along the line at an angle to the vertical plane along which the can bodies move and in which the can body feeder operates, said reciprocating can head feeder delivering the can heads to a position in axial alinement with the first seaming head, substantially as described.

10. In combination in a can heading machine, a seaming mechanism, means for feeding cans into alinement with the said seaming means, means for feeding can covers to and holding them in alinement with said seaming mechanism and the can body, said means comprising a member having a back and forth movement and provided with a part of the seat for the can cover to carry and support the can covers and a member having the complementary part of said seat, the back and forth moving member advancing and retreating in relation to the complementary member and moving the can covers thereto, a hopper to hold a stack of can covers beneath which the back and forth moving feeder operates and guard means to prevent the carrying forward of any can cover excepting the lowermost one with which the feeder engages, said guard means being located adjacent the hopper for the covers and extending between the hopper and the complementary member and above the path of movement of the feed member, and having its edge adjacent the hopper curved to conform substantially to the edge of the can cover, and means for raising and lowering the can bodies, said bodies when raised taking on their heads from the seat in the two members, substantially as described.

11. In combination in a can heading machine, a seaming mechanism, means for feeding cans into alinement with the said seaming mechanism, means for feeding can heads to and holding them in alinement with the said seaming mechanism and the positioned can body, said means comprising a member having a back and forth movement and provided with a part of the seat for the can head and a member having the complementary part of the said seat, the back and forth moving member advancing and retreating in relation to the complementary member and moving the can heads thereto, said back and forth moving member carrying the can heads and supporting them until they are taken by the upwardly moving can body, and means for raising and lowering the can bodies, said bodies when raised taking on their heads from the seat in the two members and guard means to prevent the forward movement of the can covers excepting the lowermost one, consisting of a plate overlying the path of the feeder with its can cover seat and serving to hold the can cover in said seat in the back and forth moving member, said plate having its end adjacent the complementary member curved to conform substantially to the peripheral edge of the can cover, substantially as described.

12. In combination in a can heading machine, a seaming mechanism, means for feeding can bodies into alinement with said seaming mechanism, means for feeding can covers to and holding them in alinement with said seaming mechanism, and the can body, said means comprising a member having a back and forth movement and provided with a part of the seat for the can cover, which seat is of an extent more than a semicircle and a member having a complementary part of said seat fixed below the seaming mechanism and in the same horizontal plane with the back and forth moving member, the back and forth movement of the feeding member feeding the can covers to the complementary member, means for raising and lowering the can bodies in relation to the complementary member and seaming mechanism and guard means overlying the path of movement of the feeding member to contact with the upper sides of the can covers to hold them in the seat of the feed member of more than a semi-circle whereby the can covers will be held from tipping and the feed member will retract any can cover when not removed from the seat because of the absence of its companion can body on the raising means, substantially as described.

13. In combination in a can heading machine, a seaming mechanism, means for feeding cans into alinement with the said seaming mechanism, means for feeding can covers to and holding them in alinement with said seaming mechanism, said means comprising a plate having a back and forth movement and provided at its front with a shoulder or seat for the can cover and a fixed member beneath the seaming mechanism having the complementary part of said seat, a hopper for can covers above the back and forth moving plate and adapted to deliver can covers into the seat of said plate and to allow the covers remaining in the hopper to rest on the plain upper side of said plate when moved from its retracted position, said plate carrying a can cover when it advances and holding said cover between itself and the complementary part until taken by the can body and a guard plate arranged between the hopper and the complementary member and close above the plane of movement of the feed plate to afford a bearing on its under side for the can cover being moved by the said feed member and having its edge adjacent the hopper to contact with and hold back the next to the lowest can cover and means for raising and lowering the can bodies, substantially as described.

14. In combination seaming mechanism, a table below the same, a supporting frame, a supporting plate adjustable vertically in said frame, a vertical shaft, a cam thereon driven thereby and adjustable along the shaft by a connection with the adjustable supporting plate, a bracket carrying the table movable vertically on the adjustable plate, an arm pivotally mounted on the bracket and having its free end engaging the cam and a spring connecting the arm with the bracket and forming a compensating connection to accommodate variations in can bodies or covers, the vertical adjustment of the supporting plate serving to set the table with its operating means initially to different heights to approximate the requirements of different can lengths, substantially as described.

15. In combination seaming mechanism comprising a chuck and a spindle extending up therefrom, a head rotatable about said spindle, seaming rolls carried by said head, a support for the spindle of the chuck and means for adjusting the said spindle vertically, said adjusting means comprising inclined surfaces on the spindle and conically pointed screws for engaging said inclined surfaces, one to adjust the spindle upwardly and the other in coöperation with the one first mentioned for adjusting the spindle downwardly, substantially as described.

16. In combination in a can head seaming machine, a seaming head, a member below said head having a seat for a can cover of less than a semi-circle, a hopper for can covers to hold a pile of said covers one above another, a feed slide reciprocating beneath the hopper, and having a seat for can covers at its forward end of more than a semi-circle to hold and carry the can covers to the complemental member, which is in the same horizontal plane therewith, means for feeding can bodies, and means for elevating the can bodies between the cover seat member and the feed slide to take on the can cover, and move it up to the seaming mechanism, substantially as described.

In testimony whereof we affix our signatures.

EDGAR R. LOWEREE.
GEO. F. JACKSON.